US010800121B2

(12) United States Patent
Nakamura

(10) Patent No.: US 10,800,121 B2
(45) Date of Patent: Oct. 13, 2020

(54) TIRE VULCANIZATION METHOD, TIRE PRODUCTION METHOD AND TIRE

(71) Applicant: SUMITOMO RUBBER INDUSTRIES, LTD., Kobe-shi, Hyogo (JP)

(72) Inventor: Yoshinobu Nakamura, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 515 days.

(21) Appl. No.: 15/163,149

(22) Filed: May 24, 2016

(65) Prior Publication Data

US 2016/0375645 A1    Dec. 29, 2016

(30) Foreign Application Priority Data

Jun. 23, 2015   (JP) .................................. 2015-125601

(51) Int. Cl.
*B29D 30/06* (2006.01)
*B29C 37/00* (2006.01)
*B29K 105/00* (2006.01)

(52) U.S. Cl.
CPC ...... *B29D 30/0662* (2013.01); *B29C 37/0067* (2013.01); *B29C 37/0092* (2013.01); *B29D 30/0601* (2013.01); *B29C 37/0071* (2013.01); *B29K 2105/258* (2013.01)

(58) Field of Classification Search
CPC ............ B29C 37/0067; B29C 37/0075; B29C 37/0071; B29D 30/0662; B29D 30/0601
See application file for complete search history.

(56) References Cited

U.S. PATENT DOCUMENTS

| 3,595,950 A | 7/1971 | Mezynski |
| 4,329,265 A | 5/1982 | Hallenbeck |
| 4,551,362 A * | 11/1985 | Harms ................... B29B 13/00 427/180 |
| 4,857,397 A * | 8/1989 | Mowdood ............... B29C 33/62 428/323 |
| 5,628,956 A * | 5/1997 | Theusner ............... B05D 1/045 264/130 |
| 5,738,813 A * | 4/1998 | Naganawa ............. B29C 33/64 106/38.22 |
| 6,720,033 B1 * | 4/2004 | Sandstrom ......... B29D 30/0662 427/385.5 |
| 2009/0114329 A1 * | 5/2009 | Tomoi .................... B29C 33/68 152/510 |

FOREIGN PATENT DOCUMENTS

| JP | 56-155254 A | 12/1981 |
| JP | 08142225 A * | 6/1996 |
| JP | 3316034 B2 | 8/2002 |
| JP | 5216110 B2 | 6/2013 |

OTHER PUBLICATIONS

Office Action issued in Japanese Patent Application No. 2015-125601 dated Sep. 11, 2018.

* cited by examiner

*Primary Examiner* — Jacob T Minskey
*Assistant Examiner* — Cedrick S Williams
(74) *Attorney, Agent, or Firm* — Birch, Stewart, Kolasch & Birch, LLP

(57) ABSTRACT

An object of the present invention is to provide a tire vulcanization method in which there is no air remained between a vulcanization mold and an unvulcanized tire in tire vulcanization, the unvulcanized tire easily fits the vulcanization mold and an occurrence of bareness is prevented. The present invention relates to a tire vulcanization process comprising an application process of applying a coating agent comprising powder on a surface of an unvulcanized tire and a vulcanization process of vulcanizing the unvulcanized tire obtained in the application process, a tire production method comprising the vulcanization method, and a tire produced by the tire production method.

7 Claims, No Drawings

TIRE VULCANIZATION METHOD, TIRE PRODUCTION METHOD AND TIRE

TECHNICAL FIELD

The present invention relates to a tire vulcanization method comprising a process of applying predetermined powder on a surface of an unvulcanized tire, a tire production method comprising this vulcanization method and a tire.

BACKGROUND OF THE INVENTION

A vulcanization process of a tire has been performed by inflating a balloon-shaped bladder from the inside of a formed unvulcanized tire and pushing the bladder against a heated vulcanization mold. The inflation of the bladder is performed by filling high-temperature and high-pressure steam inside thereof, but if air remains between the vulcanization mold and the surface of a tire, a defect called bareness that the surface of the tire is recessed may occur.

In order to prevent bareness, for example, JP 5216110 B suggests a vulcanization mold be provided with a slot and a vent hole, but portions in a mold where such processing is possible are restrictive.

Further, with respect to a tire vulcanization method, while many reports are seen regarding releasability between an unvulcanized tire and a bladder (for example, JP 3316034 B), a technique of allowing an unvulcanized tire to fit a vulcanization mold has never been reported.

SUMMARY OF THE INVENTION

Problem to be Solved by the Invention

An object of the present invention is to provide a tire vulcanization method in which no air remains between a vulcanization mold and an unvulcanized tire in tire vulcanization, the unvulcanized tire easily fits the vulcanization mold and an occurrence of bareness is prevented.

The present invention relates to a tire vulcanization process comprising an application process of applying a coating agent comprising powder on a surface of an unvulcanized tire and a vulcanization process of vulcanizing the unvulcanized tire obtained in the application process.

It is preferable that the powder is carbon black and/or talc.

It is preferable that the coating agent comprises carbon black, natural rubber latex and a surfactant and a content of the carbon black in the coating agent is not less than 70% by mass.

The present invention further relates to a tire production method comprising the above tire vulcanization method and a tire produced by the tire production method.

Effect of the Invention

According to the tire vulcanization method and the tire production method comprising this tire vulcanization method of the present invention, since there is no air remained between a vulcanization mold and an unvulcanized tire in tire vulcanization and the unvulcanized tire easily fits the vulcanization mold, an occurrence of bareness can be prevented.

DETAILED DESCRIPTION

The vulcanization method of the present invention is characterized by comprising an application process of applying a coating agent comprising powder on a surface of an unvulcanized tire. After this application process, by setting the unvulcanized tire in a vulcanization mold and subjecting the unvulcanized tire to a vulcanization molding, a rubber composition becomes easy to fit the vulcanization mold and air hardly arises between the mold and the unvulcanized tire, thereby preventing an occurrence of bareness.

An unvulcanized tire to which the tire vulcanization method of the present invention can be applied is not limited particularly, as long as it is an unvulcanized tire produced via a vulcanization process of performing vulcanization by heating and applying pressure by use of a vulcanization mold. Examples thereof include tires for vehicles, motorcycles and truck busses, which are formed by laminating each component of a tire on a tire forming machine.

The coating agent is a coating agent comprising powder, and may be a coating agent composed of powder only or a liquid coating agent comprising powder and a liquid solvent. A liquid coating agent comprising powder and a liquid solvent is preferable since the effect of the present invention can be exerted better.

Specific examples of powder include inorganic powder such as carbon black, talc, silica, calcined clay and the like. Among these, carbon black is more preferable since a surface of a tire can be dusted uniformly.

In the case where a liquid coating agent in which powder and a liquid solvent are mixed is used, an example of the liquid solvent includes natural rubber latex and the like.

Additionally, a liquid coating agent may comprise components other than powder and a liquid solvent. An example of the other components includes a surfactant and the like.

An application method of a coating agent, in the case of a liquid coating agent, preferably dilutes a commercially available coating agent (for example, HAKUREX T-785 manufactured by Hakuto Co., Ltd.) two to three times with water and applying the coating agent with a blush for one time. In the case of a coating agent composed of powder only, an application can be carried out by dusting the coating agent.

In the case where a liquid coating agent is applied, the applied amount is preferably not less than 30 g/m$^2$ since the effect of the present invention can be sufficiently obtained. On the other hand, the applied amount is preferably not more than 60 g/m$^2$ since the coating agent easily drips, a drying time becomes longer and the effect does not change even if the amount is increased more than this.

The application range of the coating agent may be the entire surface of the unvulcanized tire which contacts the vulcanization mold, or if the portions where an occurrence frequency of bareness is high are recognized, the coating agent may be applied to that portions only. The portions where an occurrence frequency of bareness is high include joint portions between a side wall member and a tread member, portions where a tread main groove and a side wall marking are formed and the like. It is noted that if the coating agent infiltrates into a boundary between components of a tire, it may be a cause of peeling between the components and thus it is preferable that the coating agent is not applied to the boundary.

The unvulcanized tire obtained in the application process may proceed to a next process as it is, but in the case where a liquid coating agent is used as a coating agent, it is preferable to carry out a drying process for preventing deterioration of workability due to dripping and the like.

The tire vulcanization method of the present invention is a vulcanization method comprising a vulcanization process of vulcanizing the unvulcanized tire obtained in the above application process. By setting the unvulcanized tire to which the above coating agent is applied in a vulcanization mold and carrying out vulcanization, a rubber composition easily fits the vulcanization mold and air hardly arises between the mold and the unvulcanized tire, thereby preventing an occurrence of bareness.

The vulcanization mold is not limited particularly and conventionally used vulcanization molds can be used.

The temperature and pressure in the vulcanization process are not limited particularly and a temperature and pressure in a conventional tire vulcanization process may be used.

The tire production method of the present invention is a tire production method comprising the above tire vulcanization method and a production method of producing a tire by carrying out the above application process and vulcanization process to an unvulcanized tire produced by a normal method. By using this tire production method, a tire production method in which an occurrence of bareness is prevented can be achieved.

A tire of the present invention is a tire produced by the above tire production method and this tire is a high quality tire in which an occurrence of bareness is small. In addition, this tire can be applied to various tires such as tires for vehicles, tires for motorcycles, tires for truck busses and the like.

EXAMPLES

The present invention will be explained based on Examples but is not limited thereto.

The chemicals used in Examples and Comparative Examples are inclusively shown below.

CB: ISFA SEAST 6 manufactured by Tokai Carbon Co., Ltd.

Talc: fine powder talc MICRO ACE P-3 manufactured by Nippon Talc Co., Ltd.

Liquid coating agent: HAKUREX T-785 manufactured by Hakuto Co., Ltd., containing 75% by mass of carbon black and 22% by mass of NR latex Stearic acid: NAA-133 manufactured by NOF Corporation

Examples and Comparative Examples

After a production of unvulcanized tires, the coating agents shown in Table 1 were respectively applied to a range centering around a side wall joint portion and then a vulcanization process was conducted under conditions of 175° C. and 15 minutes by use of a vulcanization mold without a vent hole to produce pneumatic tires having a size (265/70R17 13S) which have a relatively high occurrence frequency of bareness. It is noted that a coating agent composed of powder only was applied by dusting the coating agent and a liquid coating agent was applied with a blush. The following evaluation was carried out with respect to the produced pneumatic tires. The evaluation results are shown in Table 1.

Occurrence State of Bareness

The number of tires in which bareness occurred was measured visually and the occurrence rate of bareness was calculated. The number of tests, the number of occurrence of bareness and an occurrence rate in each Example and Comparative Example are shown in Table 1.

TABLE 1

|  | Com. Ex. | | | Example | | | |
| --- | --- | --- | --- | --- | --- | --- | --- |
|  | 1 | 2 | 3 | 1 | 2 | 3 | 4 |
| Presence of coating agent | No | Yes | Yes | Yes | Yes | Yes | Yes |
| Coating agent | — | Stearic acid | Liquid coating agent | CB | Talc | Liquid coating agent | Liquid coating agent |
| Applied amount (g/m$^2$) | — | 10 | 10 | 3 | 7 | 50 | 80 |
| Evaluation result |  |  |  |  |  |  |  |
| Number of tests | 2,102 | 56 | 180 | 510 | 490 | 670 | 300 |
| Number of occurrence of bareness | 16 | 10 | 2 | 2 | 3 | 0 | 0 |
| Occurrence rate of bareness (%) | 2.60 | 17.9 | 1.11 | 0.39 | 0.61 | 0 | 0 |

From the results shown in Table 1, it is found that according to a tire vulcanization process and a tire production method comprising an application process of applying a coating agent comprising powder on an unvulcanized tire, an occurrence of bareness can be prevented.

What is claimed is:

1. A tire vulcanization process comprising:
    applying a liquid coating agent on a surface of an unvulcanized tire; and
    vulcanizing the coated unvulcanized tire to produce a vulcanized tire product;
    wherein the liquid coating agent has a carbon black content that is not less than 70% by mass,
    wherein the liquid coating agent comprises carbon black, natural rubber latex and a surfactant, and
    wherein the applied amount of the coating agent is from 50 g/m$^2$ to 80 g/m$^2$.

2. A tire production method comprising the tire vulcanization process of claim 1.

3. The tire vulcanization process of claim 1, wherein the liquid coating agent is applied to the entire surface of the unvulcanized tire.

4. The tire vulcanization process of claim 1, wherein the liquid coating agent is applied to joint portions between a side wall member and a tread member of the unvulcanized tire.

5. A tire vulcanization process comprising:
    applying a coating agent on a surface of an unvulcanized tire; and
    vulcanizing the coated unvulcanized tire to produce a vulcanized tire product;
    wherein the coating agent consists of an inorganic powder selected from the group consisting of carbon black, talc, silica, and calcined clay, wherein the applied amount of the coating agent is not less than 3 $g/m^2$.

6. The tire vulcanization process of claim 5, wherein the coating agent consists of at least carbon black.

7. A tire production method comprising the tire vulcanization process of claim 5.

\* \* \* \* \*